United States Patent [19]

Truax

[11] Patent Number: 4,843,715
[45] Date of Patent: Jul. 4, 1989

[54] LEVER ACTUATED NUTCRACKER

[76] Inventor: Frank L. Truax, 3612 Fischer Street, Crabtree, Oreg. 97335

[21] Appl. No.: 226,860

[22] Filed: Aug. 1, 1988

[51] Int. Cl.[4] .............................................. A47J 43/26
[52] U.S. Cl. ................................................... 30/120.5
[58] Field of Search ........................... 30/120.1–120.5; 99/568

[56] References Cited

U.S. PATENT DOCUMENTS

| | | | |
|---|---|---|---|
| 1,205,276 | 11/1916 | Sharpe | 30/120.5 |
| 1,254,119 | 1/1918 | Chamberlain | 30/120.5 |
| 2,178,375 | 10/1939 | Lennard | 30/120.5 |
| 3,713,468 | 1/1973 | Walgh | 30/120.2 |
| 4,255,855 | 3/1981 | Brazil | 30/120.5 |
| 4,641,430 | 2/1987 | Hahn | 30/120.5 |

Primary Examiner—Douglas D. Watts
Attorney, Agent, or Firm—Henderson & Sturm

[57] ABSTRACT

A nutcracking apparatus having a base and a member attached at the bottom thereof to the front and top portions of the base and extending upwardly therefrom. A first nut contacting blade is attached to the one side of the member. An elongated plunger has a second nut contacting blade attached to one end thereof and guide structure is provided for reciprocally mounting the plunger to the base to cause the plunger to stay in the same path during reciprocation between a first position and a second position for cracking the nut. A handle is pivotally attached at one end thereof to the other end of the plunger along the first axis and a cantilever structure is rigidly attached at one end thereof to one end of the handle and extends in one direction away from the first axis. A link member is pivotally attached at one end thereof along a second axis to the other end of the cantilever and at the other end thereof to a top portion of the guide structure, whereby pivotal movement of the handle from a first position thereof to a second position thereof causes a corresponding movement of the plunger from the first to the second position thereof, thereby opening a nut which has been placed between the blades.

9 Claims, 4 Drawing Sheets

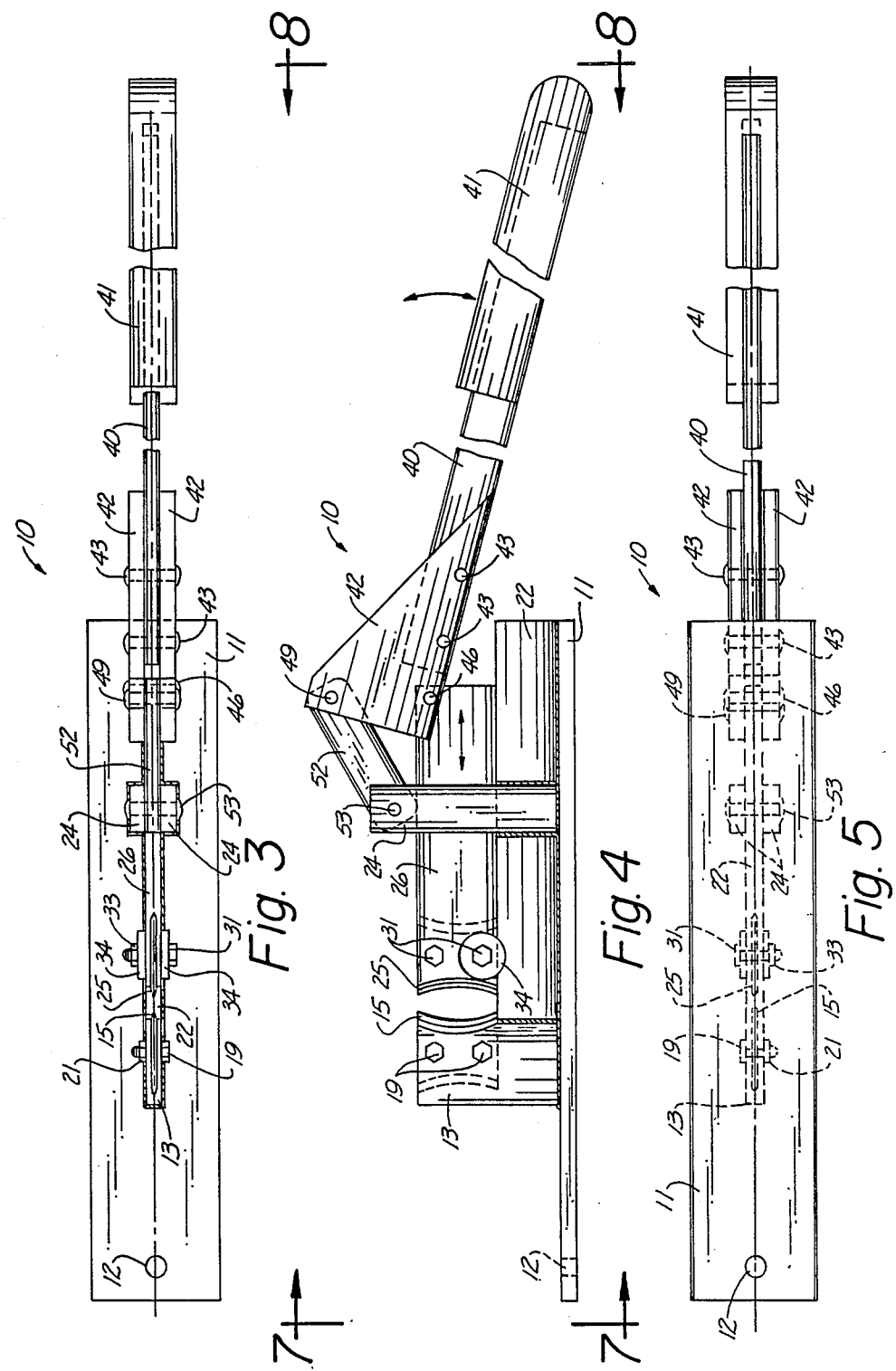

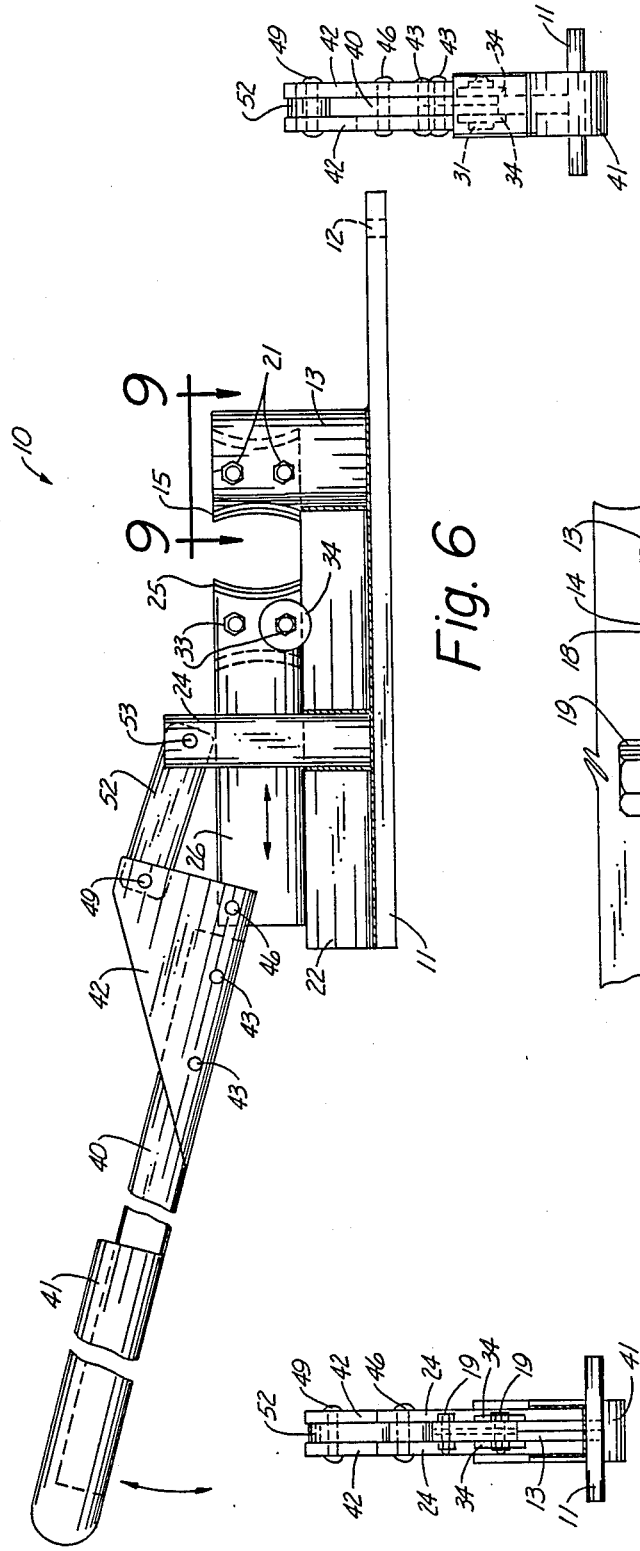

LEVER ACTUATED NUTCRACKER

TECHNICAL FIELD

The present invention relates generally to a nutcracker, and more particularly to a nutcracker which will split black walnuts first in half and then again in fourths if necessary for obtaining the nutmeat with a minimum of damage thereto.

BACKGROUND ART

The problem of obtaining the meat from a nut with a hard shell is a long standing one. Some manual nutcrackers are adequate for most nuts, but are not adequate for black walnuts, which have an extremely hard and seemingly impenetrable shell. Consequently, for someone who does not normally crack open black walnuts, a hammer or the like must be used to smash the black walnut shell to obtain the meat. The problem with such an approach is that quite often, too much force is used and the meat itself is smashed as well a the shell.

U.S. Pat. Nos. 1,254,119 to Chamberlain et al, 2,178,375 to Lennard, 4,255,855 to Brazil and 4,641,430 to Han show that people have been trying to adequately solve this problem from at least 1918 to the present day. No doubt, many earlier attempts to solve the problem were made as well. Despite all of the efforts in this regard heretofore, there still exists a need for a black walnut cracker that can rapidly and easily open one black walnut after another for efficient retrieval of the nutmeat.

DISCLOSURE OF THE INVENTION

The present invention relates to a nutcracking apparatus having a base and a member attached at the bottom thereof to the front and top portions of the base and extending upwardly therefrom. A first nut contacting blade is attached to the one side of the member.

An elongated plunger has a second nut contacting blade attached to one end thereof and guide structure is provided for reciprocally mounting the plunger to the base to cause the plunger to stay in the same path during reciprocation between a first position and a second position for cracking the nut.

A handle is pivotally attached at one end thereof to the other end of the plunger along the first axis and a cantilever structure is rigidly attached at one end thereof to one end of the handle and extends in one direction away from the first axis. A link member is pivotally attached at one end thereof along a second axis to the other end of the cantilever member and at the other end thereof to a top portion of the guide structure, whereby pivotal movement of the handle from a first position thereof corresponding to the first position of the plunger, to a second position thereof causes a corresponding movement of the plunger from the first to the second position thereof, thereby opening a nut which has been placed between the blades.

An object of the present invention is to provide an improved nutcracker.

Another object of the present invention is to provide a nutcracker which will easily and quickly open black walnuts.

A further object of the present invention is to provide a nutcracker of the aforementioned type which is faster and more efficient in opening black walnuts to obtain the nutmeat therefrom than any manual nutcracker heretofore produced.

A still further object of the present invention is to provide a nutcracker of the aforementioned type which opens black walnuts with a minimum of damage to the nutmeat disposed therein.

Other objects, advantages, and novel features of the present invention will become apparent from the following detailed description of the invention when considered in conjunction with the accompanying drawings.

BRIEF DESCRIPTION OF THE DRAWINGS

FIG. 3 is a top plan view of the preferred embodiment shown in FIG. 1;

FIG. 4 is a side elevational view of the nutcracker shown in FIG. 1 but with the handle and plunger moved to a second position thereof;

FIG. 5 is a bottom plan view of the preferred embodiment of the invention shown in FIG. 1;

FIG. 6 is a view of the other side of the preferred embodiment shown in FIGS. 1 and 4 but with the handle and plunger in the first position thereof in readiness to crack a nut or the like;

FIG. 7 is a view taken along line 7—7 of FIG. 4;

FIG. 8 is a view taken along line 8—8 of FIG. 4;

FIG. 9 is an enlarged view taken along line 9—9 of FIG. 6; and

FIG. 10 is a perspective view of how a walnut is held during the cracking process.

BEST MODE FOR CARRYING OUT THE INVENTION

Figure 1:
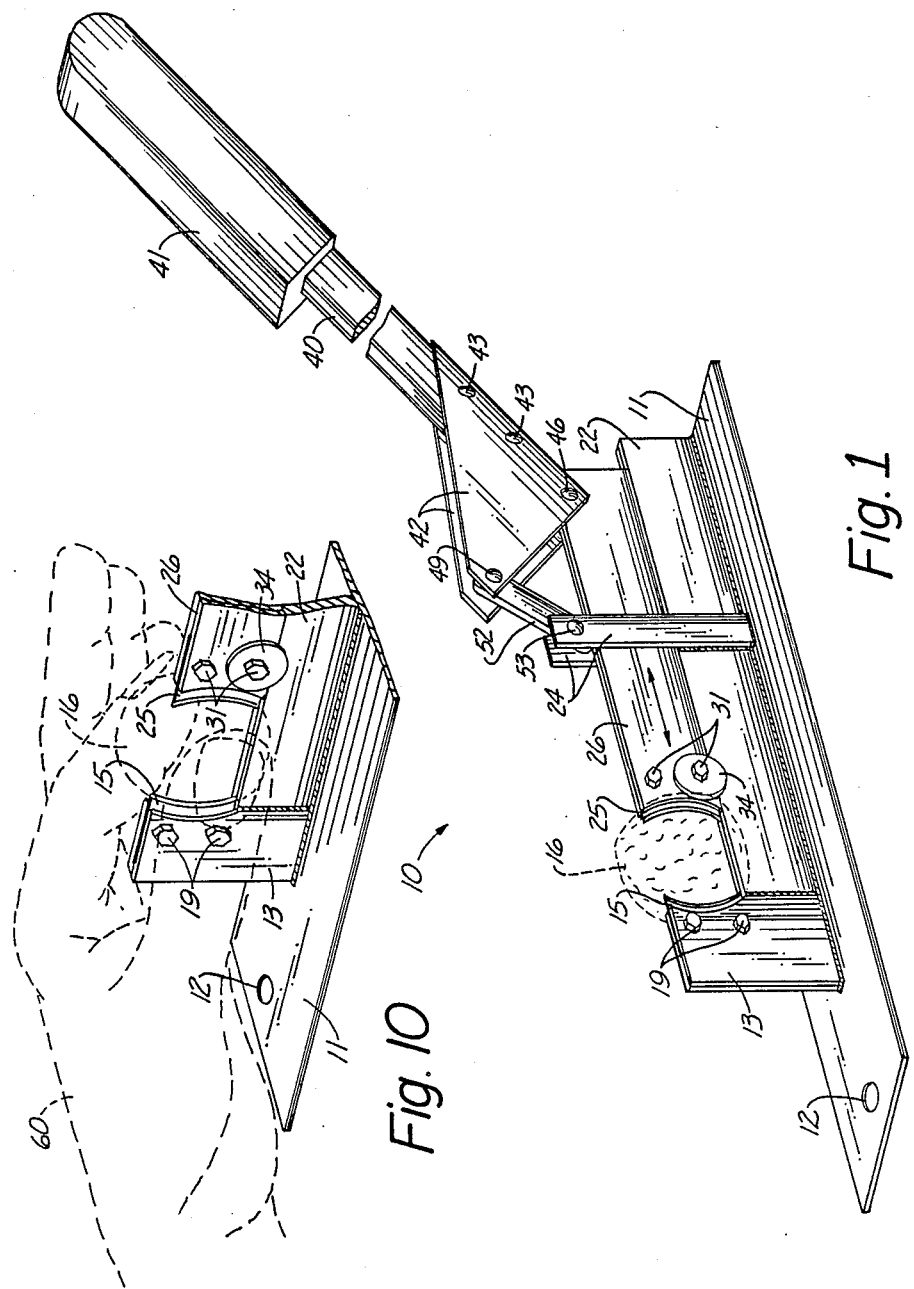
FIG. 1 is a perspective view of a nutcracker constructed in accordance with the present invention shown in readiness to open a black walnut, shown in dashed lines.
Figure 2:
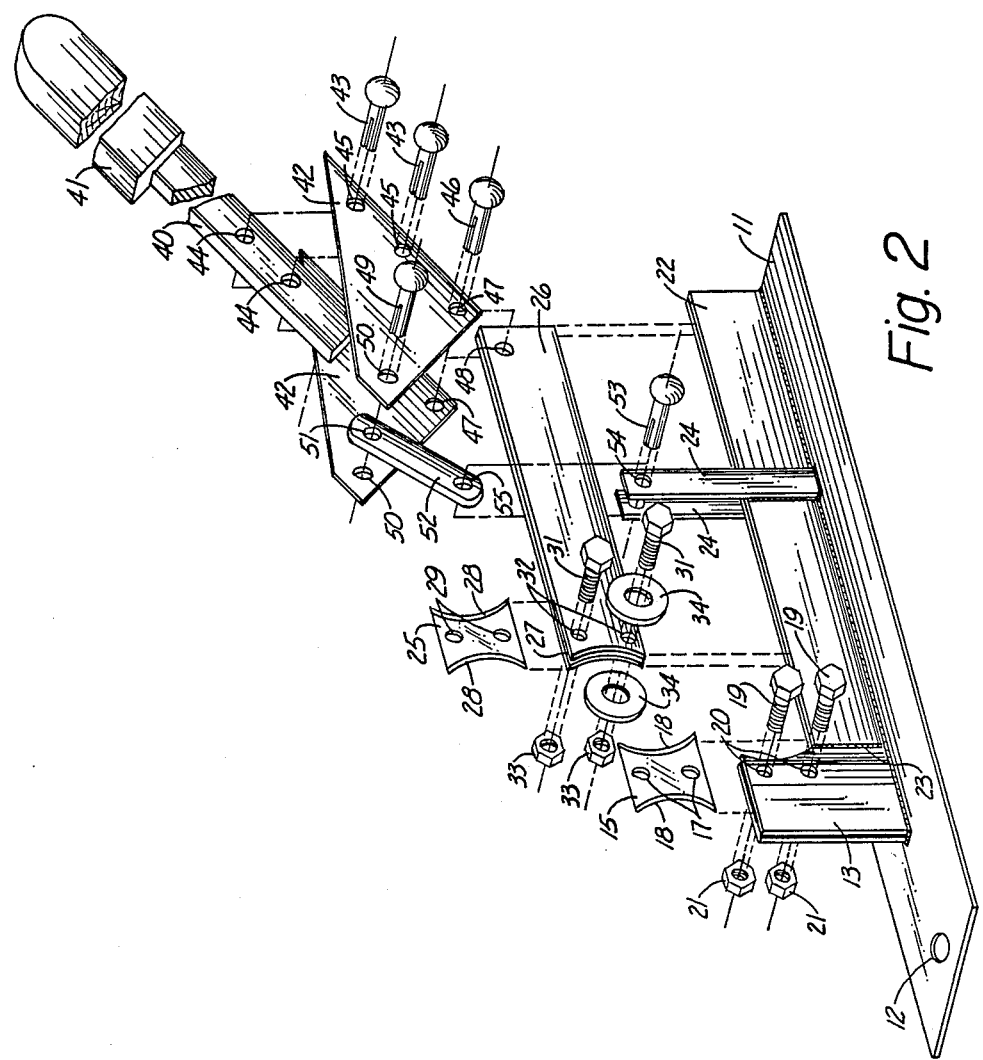
FIG. 2 is an exploded perspective view of the preferred embodiment shown in FIG. 1.

Referring now to the drawings wherein like reference numerals designate identical or corresponding parts throughout the several views, FIG. 1 shows a nutcracker (10) constructed in accordance with the present invention.

The nutcracker (10) has a metal base (11) with an opening (12) disposed in one end thereof for allowing the base (11) to be secured to a bench or tabletop or the like. A two-piece member (13) is welded at the bottom thereof to the base (11) and has a slot (14) disposed therein for receiving a blade (15). The blade (15) has a pair of openings (17) therein and a pair of sharpened edges (18). Bolts (19) extend through the openings (17) and through openings (20) in the two-piece member (13) to hold the blade (15) securely in place or allow it to be reversible to use either of the edges (18). Nuts (21) hold the bolts (19) in place.

A support member (22) is welded at the bottom thereof to the base (11) and at one end thereof is welded by a weld (23) to the two-piece upstanding member (13). Guide straps (24) are welded to each side of the support member (22) and at the bottom thereof to the base (11).

A two-piece plunger (26) has a slot (27) formed on the forward end thereof to receive a blade (25) having a pair of sharpened edges (28) thereon and a pair of holes (29) therein. The blades (15) and (25) are preferably identical and interchangeable as well as being reversible to utilize either edge to contact a nut or the like.

The blade (25) is held in place by a pair of bolts (31) which extend through openings (32) in the two-piece plunger (26) and through openings (29) in the blade (25). Washer flanges (34) are disposed on each side of the two-piece plunger (26) and are held in place by the lower bolt (31) and the lower nut (33). The nuts (33), of curse, hold the bolts (31) securely in place but permit them to be removable for reversing the blade (25) or removing it entirely for sharpening or replacement.

The blades (15) and (25) extend only 1/8" from the members (13) and (26) respectively so that penetration does not extend into the meat of the nut (16).

A handle (40) has a soft rubber or plastic grip (41) secured to one end thereof. The other end of the handle (40) has cantilever members (42) rigidly attached thereto by rivets (43) which extend through openings (44) in the handle (40) and through openings (45) in the cantilever members (42). Rivet (46) extends through openings (47) in the cantilever members (42) and also through the opening (48) in the other end of the plunger (26). Another rivet (49) extends through openings (50) in cantilever members (42) and through an opening (51) in link member (52).

Still another rivet (53) extends through openings (54) in guide members (24) and through an opening (55) in the link member (52).

In operation, the nutcracker (10) would be utilized by moving the handle (40) to the first position shown in FIG. 1 and 6 and placing a walnut (16) manually in the position shown in FIG. 1 wherein the bottom of the walnut would rest on a top portion of the support member (22). Then, while manually holding the nut (16), the handle (40) would be pushed downwardly until the blades (15) and (25) come in contact with the seam of the walnut (16). At such time, the user would hold the walnut in his or her hand (60) between the thumb and forefinger, reaching around the back of member (13) or as shown in FIG. 10, and then continue to move the handle (40) downwardly from the position shown in FIG. 1 to the position shown in FIG. 4 whereupon the blades (15) and (25) will move from the position shown in FIGS. 1 and 6 to the position shown in FIG. 4, thereby splitting the walnut (16) in half. The meat from the walnut (16) can then be removed under some circumstances and under other circumstances, the two halves of the walnut (16) can be cut into fourths by the same procedure just outlined above.

Once the blades (15) and (25) become dull on the nut contacting edges thereof, they can be reversed by removing the fasteners (19) and (31). Of course the blades (15) and (25) are also replaceable and resharpenable. The curved cutting surfaces (18) and (28) also tend to conform to the size of the nut (16) diameter to better hold the nut in place before it is cracked and also to cause less damage to the meat after the nut (16) is cracked.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A nut cracking apparatus comprising:
    a base having a top and bottom portion, a front portion and a rear portion;
    a member attached at the bottom thereof to said front and top portions of said base and extending upwardly therefrom;
    a first nut contacting means attached to one side of said member;
    an longated plunger having a first end, a second end, a top, a bottom and two opposed sides;
    a second nut contacting means attached to one end of said plunger;
    guide means for reciprocally mounting said plunger to said base to cause said plunger to stay in the same path during reciprocation between a first position and a second position, said second nut contacting means being closer to said first nut contacting means in the second position of the plunger than in the first position thereof, said guide means being operatively attached to said base and extending on both sides of said plunger;
    a handle pivotally attached at one end thereof to the other end of said plunger along a first axis;
    cantilever means rigidly attached at one end thereof to said one end of said handle and extending in one direction thereof away from said first axis; and
    a link member pivotally attached at one end thereof along a second axis to the other end of said cantilever means and at the other end thereof to a top portion of said guide means, whereby pivotal movement of said handle from a first position thereof corresponding to the first position of said plunger, to a second position thereof causes a corresponding movement of the plunger from the first to the second position thereof.

2. The apparatus of claim 1 including means for anchoring the front portion of said base to a horizontal surface.

3. The apparatus of claim 1 wherein said first and second nut contacting means comprise a pair of blades for contact with a nut for cracking a nut in half.

4. The apparatus of claim 3 wherein the blade portions are arcuately shaped for generally conforming to a generally curved configuration of nuts to be cracked.

5. The apparatus of claim 3 wherein said pair of blades have double sided curved edges;
    first means for selectively removably attaching said first nut contacting means to said member for permitting the curved blade thereof to be reversible; and
    second means for selectively removably attaching said second nut contacting means to said one end of the plunger for permitting the curved blade thereof to be reversible.

6. The apparatus of claim 1 including supporting means attached to the top of said base for supporting a nut on one top portion thereof and for slidingly supporting said plunger on another top portion thereof.

7. The apparatus of claim 1 including a pair of flanges attached to the bottom portion of said one end of said plunger and extending on each side of said supporting means for preventing said one end of said plunger from moving off of said supporting means during reciprocal movement thereof.

8. The apparatus of claim 7 wherein said pair of flanges comprise a pair of annular washers having a nut and bolt fastener means receiving said annular washers to said one end of said plunger.

9. The apparatus of claim 3 wherein said pair of blades are generally in alignment with a single plane.

* * * * *